United States Patent [19]

Masuda et al.

[11] Patent Number: 5,608,585

[45] Date of Patent: *Mar. 4, 1997

[54] MAGNETIC RECORDING AND REPRODUCING APPARATUS WITH REPOSITIONING STOP MODE

[75] Inventors: Kenmei Masuda; Kenji Ogiro; Hidefumi Goto, all of Yokohama; Sadao Hirose; Satoshi Fujino, both of Shimotsuga-gun; Shinya Fujimori, Yokohama; Katsuhiko Izumi, Chigasaki, all of Japan

[73] Assignee: Hitachi, Ltd., Tokyo, Japan

[*] Notice: The term of this patent shall not extend beyond the expiration date of Pat. No. 5,448,427.

[21] Appl. No.: 462,536

[22] Filed: Jun. 5, 1995

Related U.S. Application Data

[63] Continuation of Ser. No. 561,574, Aug. 2, 1990, Pat. No. 5,448,427.

[30] Foreign Application Priority Data

Aug. 21, 1989 [JP] Japan ...................................... 1-212901

[51] Int. Cl.⁶ .............................. G11B 15/18; G11B 15/48
[52] U.S. Cl. ........................ 360/72.1; 360/74.1; 360/72.3
[58] Field of Search ...................... 360/71, 72.1, 72.3, 360/73.01, 73.11, 25, 96.4, 74.1, 73.12, 13, 77.12, 72.2, 69, 75, 74.4; 369/33

[56] References Cited

U.S. PATENT DOCUMENTS

| | | | |
|---|---|---|---|
| 4,664,336 | 5/1987 | Koyama | 360/74.2 |
| 4,961,120 | 10/1990 | Mototake et al. | 360/85 |
| 5,313,344 | 5/1994 | Sakaguchi et al. | 360/69 X |
| 5,448,427 | 5/1995 | Masuda et al. | 360/72.3 X |

*Primary Examiner*—Aristotelis Psitos
*Assistant Examiner*—Regina Y. Neal
*Attorney, Agent, or Firm*—Antonelli, Terry, Stout & Kraus, LLP

[57] ABSTRACT

A tape run control unit in the magnetic recording/reproducing apparatus is provided with a discrimination element and a control element. The discrimination element detects a stand-by time until a signal to be recorded is received in repositioning of the tape and generates a discrimination signal for discriminating the length of the stand-by time. The control element controls tape run driving unit such as a capstan motor during the reposition and controls the stop position of the tape such that a magnetic head scans the portion of the tape where no data is recorded. After completion of repositioning, furthermore, the control element works according to a discrimination signal so as to select the stop mode which involves the release of pinch roller when the stand-by time is long and to select the mode for simply stopping only the capstan when the stand-by time is short.

15 Claims, 7 Drawing Sheets

| PARTS MODE | CYLINDER | CAPSTAN | REEL | PINCH ROLLER | REEL BRAKE |
|---|---|---|---|---|---|
| PB/REC | ○ | ○ | ○ | ○ | × |
| FF/REW | ○ | × | ○ | × | × |
| STOP (NORMAL) | × | × | × | × | ○ |
| R-STOP | ○(×) | × | × | ○ | × |

FIG. 11

FIG. 10

MAGNETIC RECORDING AND REPRODUCING APPARATUS WITH REPOSITIONING STOP MODE

This application is a Continuation of application Ser. No. 07/561,574, filed Aug. 2, 1990 now U.S. Pat. No. 5,448,427.

BACKGROUND OF THE INVENTION

The present invention relates to constitution of a magnetic recording and reproducing apparatus (hereinafter referred to as a magnetic recording/reproducing apparatus) equipped with a tape-running control unit which controls the running of the tape when the data are recorded onto or reproduced from the tape or when access is made to the data recorded on the tape in order to reproduce the data or to record the data.

When access is made to a predetermined data block in a conventional magnetic recording/reproducing apparatus, the position of a data block just before the predetermined data block is read out in order to detect the heading of the position of the data block, the tape is halted until the data to be recorded are transferred, and recording means for recording the data is maintained under stand-by condition. In this case, the cylinder mounting the recording or reproducing head continues to rotate, so that the head scans a portion of the tape on which the data are recorded.

According to the thus constituted conventional art, the stand-by condition is established when press-contact of the pinch roller with the capstan is released to separate the tape away from the capstan, and at the same time a braking force is applied to a reel plate. Therefore, when there is used a brush motor for driving the mode member, the brush is worn out at an early time to reduce the life of the motor. Further, wear in the bearing of rotary support of the pinch roller causes the pinch roller to be deviated and the mechanism to be deteriorated. The bearing of the rotary support of a brake member is worn out, too. Moreover, when the tape is at rest under the stand-by condition, the head scans repeatedly the portion of the tape where the data are recorded. Therefore, data tends to be dropped out and the S/N ratio tends to decrease resulting in the loss of reliability. In the conventional art, furthermore, no countermeasure has been made to improve the reliability and life of the mechanism during the repositioning operation of the tape, to improve the reliability of the data recorded on the tape, or to preventing the tape from being damaged.

SUMMARY OF THE INVENTION

The object of the present invention is to provide a magnetic recording/reproducing apparatus which is free from the above-mentioned problems inherent in the conventional art, and which easily makes it possible to lengthen the life of products chiefly of the mechanisms, to prevent the tape from being damaged, and to improve the reliability of the data recorded on the tape.

In order to achieve the above object, according to the present invention, the tape running control unit is provided with discrimination means and control means. The discrimination means is provided with a stand-by time detecting unit and a stand-by time comparator unit. The detecting unit is so constructed as to detect the stand-by time until the recording of data of a next group is started after the repositioning operation is finished. The comparator unit is so constructed as to compare the stand-by time with a predetermined reference value and to produce a signal representing the result of comparison. Further, based on the output signal of the comparator unit that corresponds to either a short or a long stand-by time, the control means selects not the stop mode of the mechanism, but simply selects the stop of rotation of a tape-driving-force generating unit such as a capstan motor and the stop mode of the mechanism. Such a constitution makes it possible to decrease the number of times for switching the mechanism from the recording/reproducing mode to the stop mode, enabling the life of the mechanism to be lengthened. Owing to the control means, furthermore, the tape-driving-force generating unit such as the capstan motor or the like is controlled before its rotation is stopped and when the repositioning is finished, the tape is stopped at such a position that the scanning portion of the magnetic head for the tape is located on an unrecorded area between the data groups. This helps prevent deterioration of the reliability of data such as dropout of data or decrease of the S/N ratio that stems from the scanning operation of the magnetic head.

DETAILED DESCRIPTION OF THE PREFERRED EMBODIMENT

An embodiment of the present invention is described below in conjunction with the drawings.

The embodiment of the invention will now be described with reference to FIGS. 1 to 11. The constituent elements first, and then the operation will be explained. Reference numeral 1 denotes a cylinder, 2 denotes a head, 3 denotes a host computer, 4 denotes an SCSI (small computer system interface), 5 denotes a RAM, 6 denotes a REC signal processing circuit, 7 denotes a control microcomputer, 8 denotes a RAM controller, 9 denotes a PB signal processing circuit, 10 denotes a drive microcomputer, 11 denotes a mechanism, 12 denotes a servo circuit, and reference numeral 13 denotes a tape.

Figure 1:
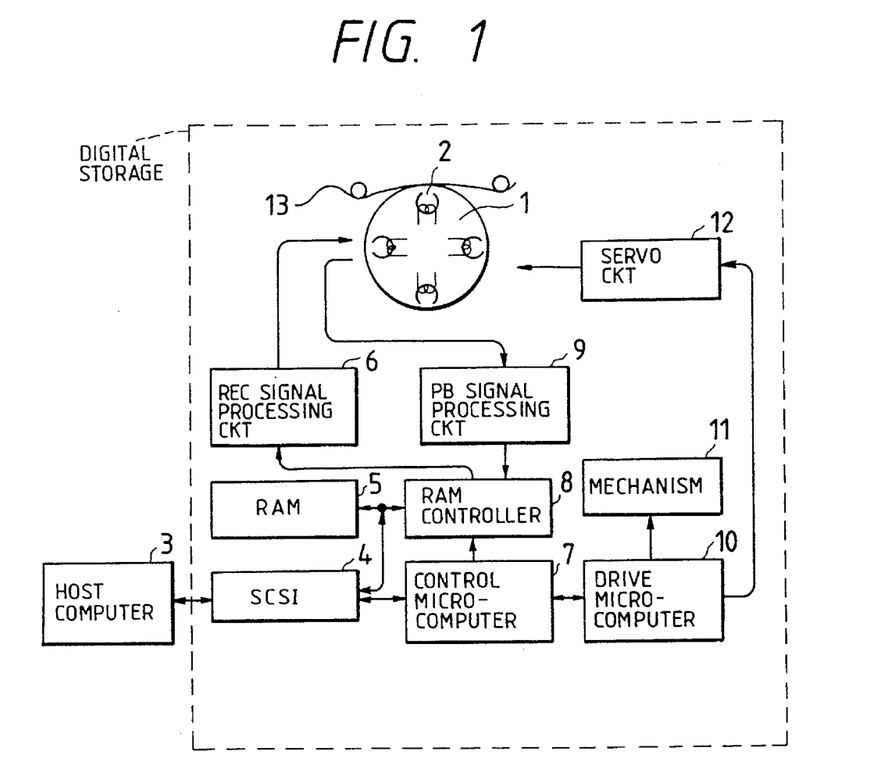
FIG. 1 is a block diagram illustrating a magnetic recording/reproducing apparatus according to an embodiment of the present invention.

Data to be recorded are transferred from the host computer 3 via the SCSI 4. These data are once stored in the RAM 5, where an error correction code is added. Then, the data are recorded, with 128 kilobytes as a group, by the head 2 onto the tape 13 via RAM controller 8 and REC signal processing circuit 6. When the data are reproduced, on the other hand, the data reproduced by the head 2 from the tape 13 are stored in the RAM 5 via the PB signal processing circuit 9 and RAM controller 8. In the RAM 5, errors in the data are corrected, and the data are returned to the host computer 3 via the SCSI 4. The control microcomputer 7 controls the operations of the mechanism, signal processing and servo units in response to commands from the host computer 3.

On the mechanism 11 is mounted the cylinder 1 in which are arranged a plurality of recording and reproducing heads 2. The head 2 comes in contact with the surface of the tape 13 to effect scanning, and records or reproduces the data. The head 2 consists of a record-only head and a reproduction-only head. During the recording, a so-called simultaneous monitoring (verify function) is effected in which the data recorded by the record-only head onto the tape 13 are reproduced simultaneously by the reproduction-only head.

Figure 2:
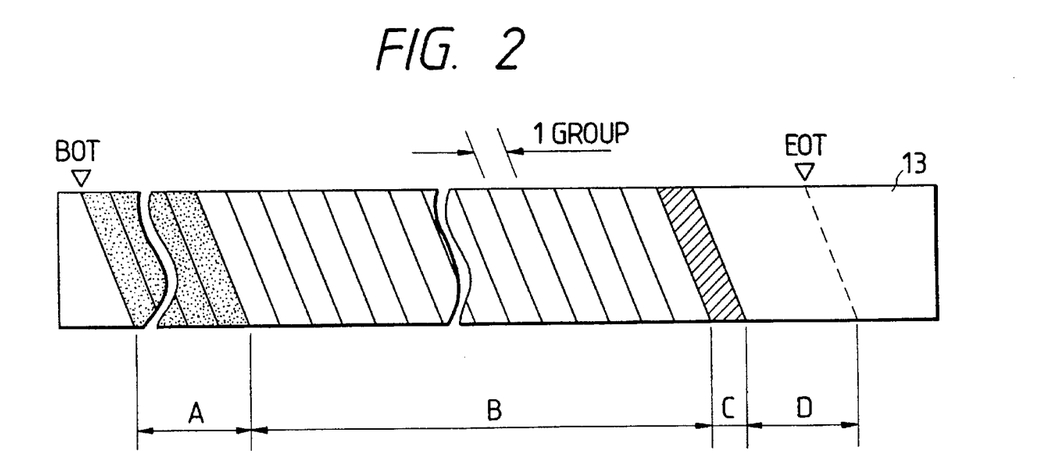
FIG. 2 is a diagram illustrating the plane of area of the whole tape.

The present invention is concerned with the constitution of a tape running control unit which controls the running of tape using the control microcomputer 7 and the drive microcomputer 10, in order to quickly transfer the data to or from the host computer 3, to lengthen the life of the mechanism, and to maintain the reliability of the data in the magnetic recording/reproducing apparatus. The details will now be described with reference to FIGS. 4 to 11. The tape format for data storage will be described with reference to FIGS. 2 and 3. FIG. 2 illustrates the kinds of areas on the whole tape for data storage.

The areas are divided into four parts as follows:

tape loading/unloading area,

B: data area,

C: end data area,

D: unformatted area

Each area is constituted by a plurality of groups each of which consisting of 128 kilobytes. The groups have a series of group numbers recorded on the subcode area (not shown) from the tape leading end, and for any desired group, recording and reproducing can be done using the number.

Figure 3:
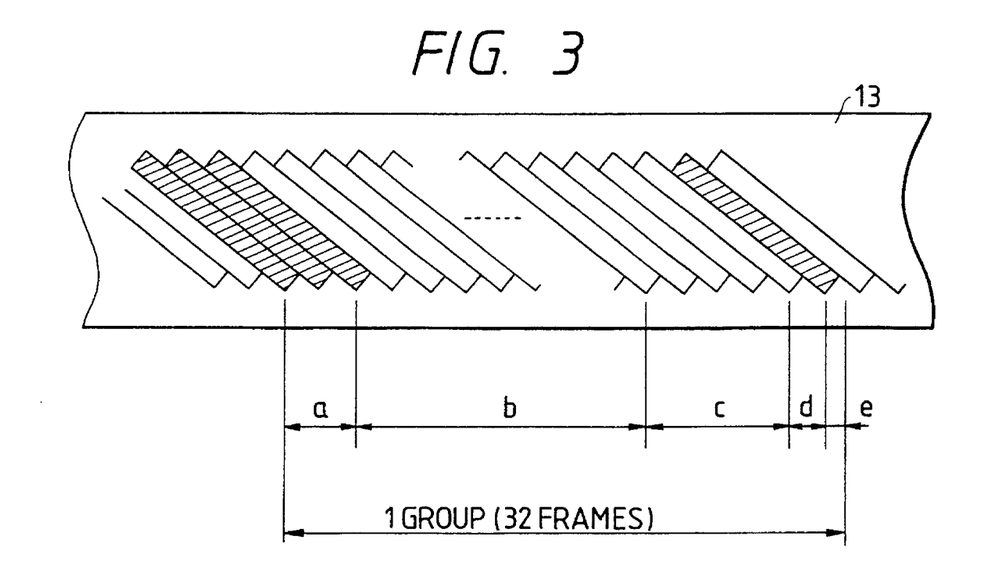
FIG. 3 is a diagram illustrating the format of one group.

FIG. 3 shows the tape format of one group. A gap equivalent to three tracks is provided at the start portion of the group and a gap equivalent to one track is provided at the end portion.

In this format, the data can be rewritten, with one group as a writing unit. Therefore, the above-mentioned gaps are provided because when only a particular group is to be rewritten, variation in the running speed of the tape results in the erasure of part of the track of another group. To cope with this, the gap areas are provided at the start portion and the end portion of the groups.

No data is recorded on the gap areas except the ATF signals and subcode signals. On the data area (regions b and c in FIG. 3) between the gaps are recorded data and C3 parity (error correction code which will not be described in detail).

Figure 4:
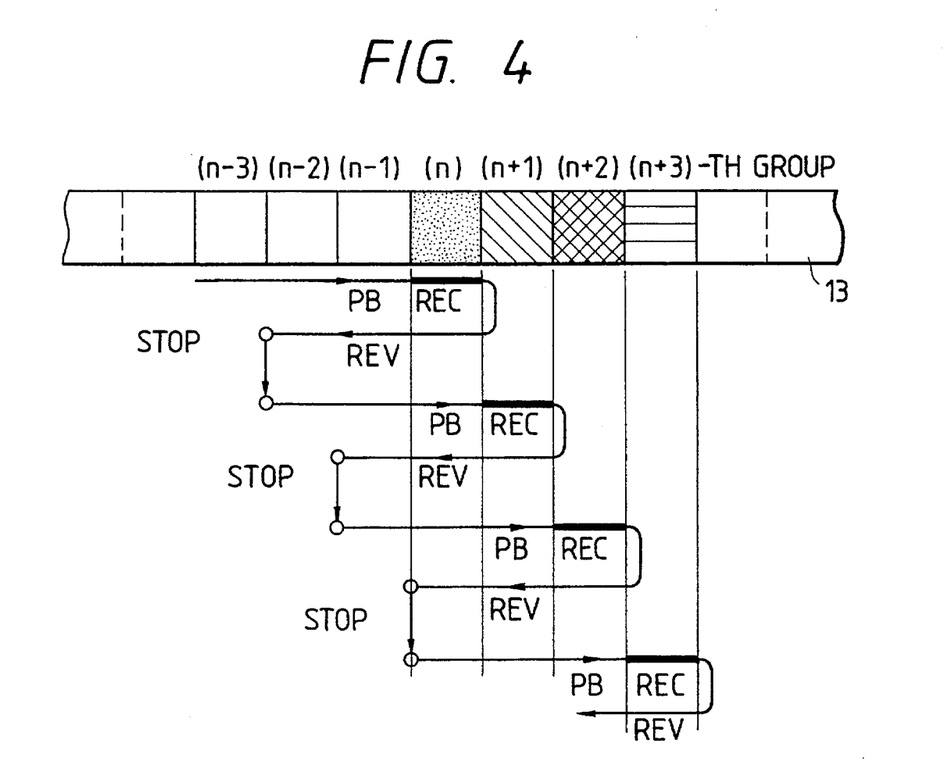
FIG. 4 is a diagram illustrating the recording or reproducing operation for each group.

FIG. 4 illustrates the following operations of the apparatus when data are to be recorded or reproduced by the group. (1) The data are recorded on the n-th group. (2) The tape is moved reversely in the REV mode and is stopped at a position three groups before the (n+1)-th group on which the next data are to be recorded, that is, the tape is stopped at the start end of the (n−2)-th group. This operation will be referred to as repositioning.

The state that the tape is stopped at the (n-2)-th group will be referred to as the completion of repositioning. This is to provide a runway section for the starting of the motor so that the data can be flawlessly recorded on the (n+1)-th group. (3) When data are transferred again after the completion of repositioning, the apparatus is switched to the PB mode from the STOP mode, reproduces the signals until the n-th group in the PB mode, and is made in the REC mode at the (n+1)-th group.

In the foregoing were described basic operations for recording and reproducing data by the group. Operation of the mechanism will now be described.

Figure 5:
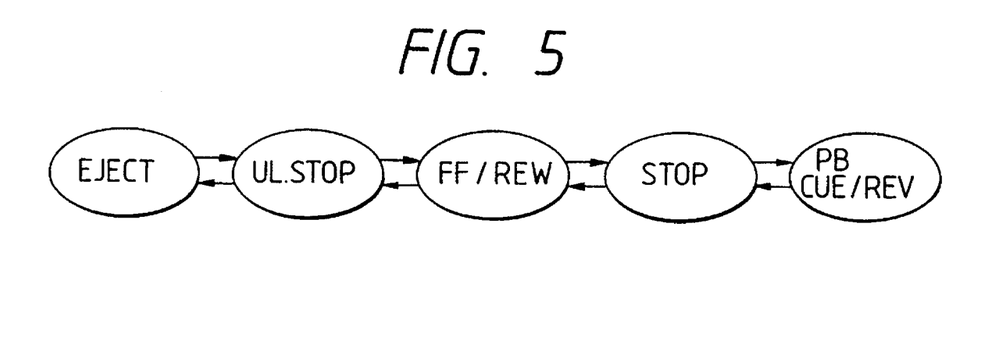
FIG. 5 is a diagram illustrating the change of mode of the mechanism.

FIG. 5 illustrates mechanism detecting modes which consists of the following five modes: EJECT mode, UL. STOP mode, FF/REW mode, STOP mode and PB mode (CUE/REV mode is the same mechanical mode as the PB mode) in order to load or unload a cassette and to control the running of the tape.

Figure 6:
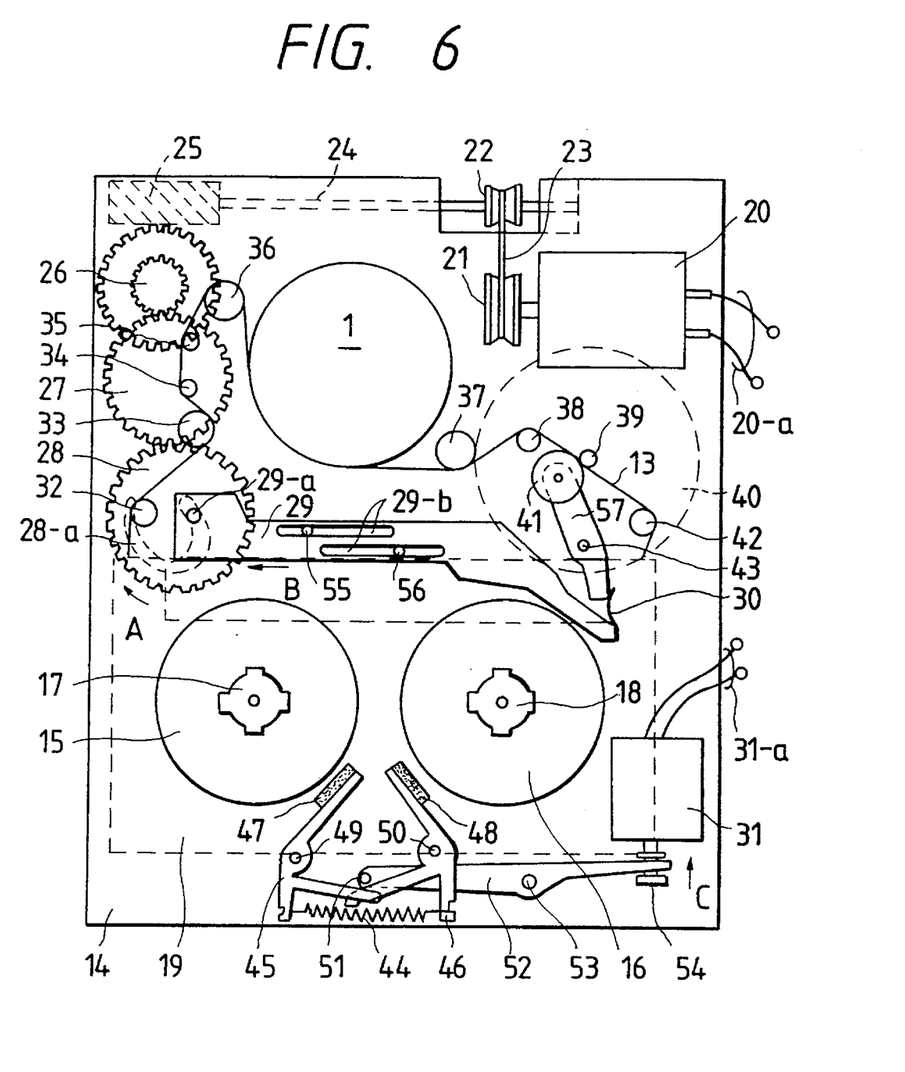
FIGS. 6, 7 and 8 are plan views of the mechanism.
Figure 7:
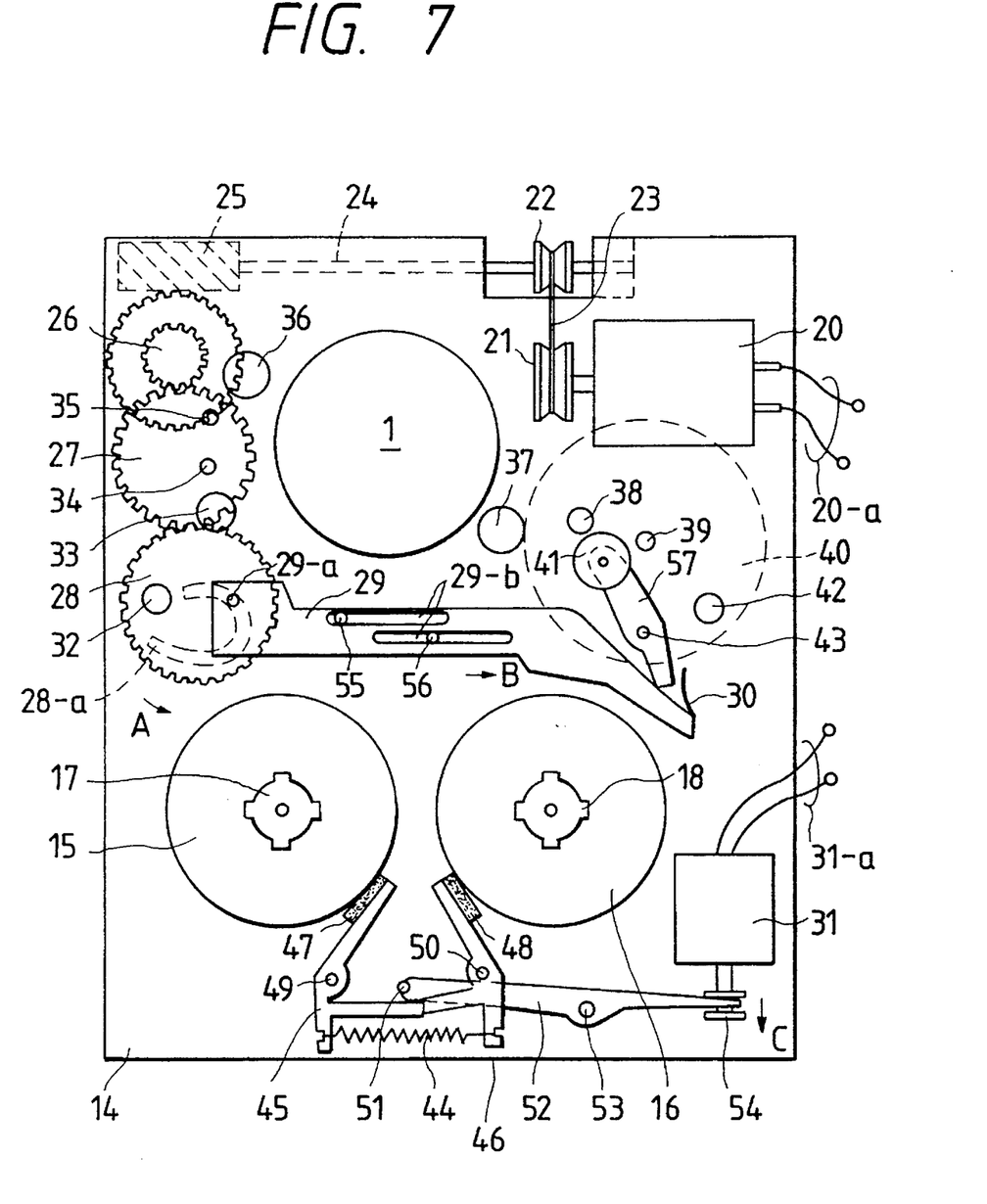
Figure 8:
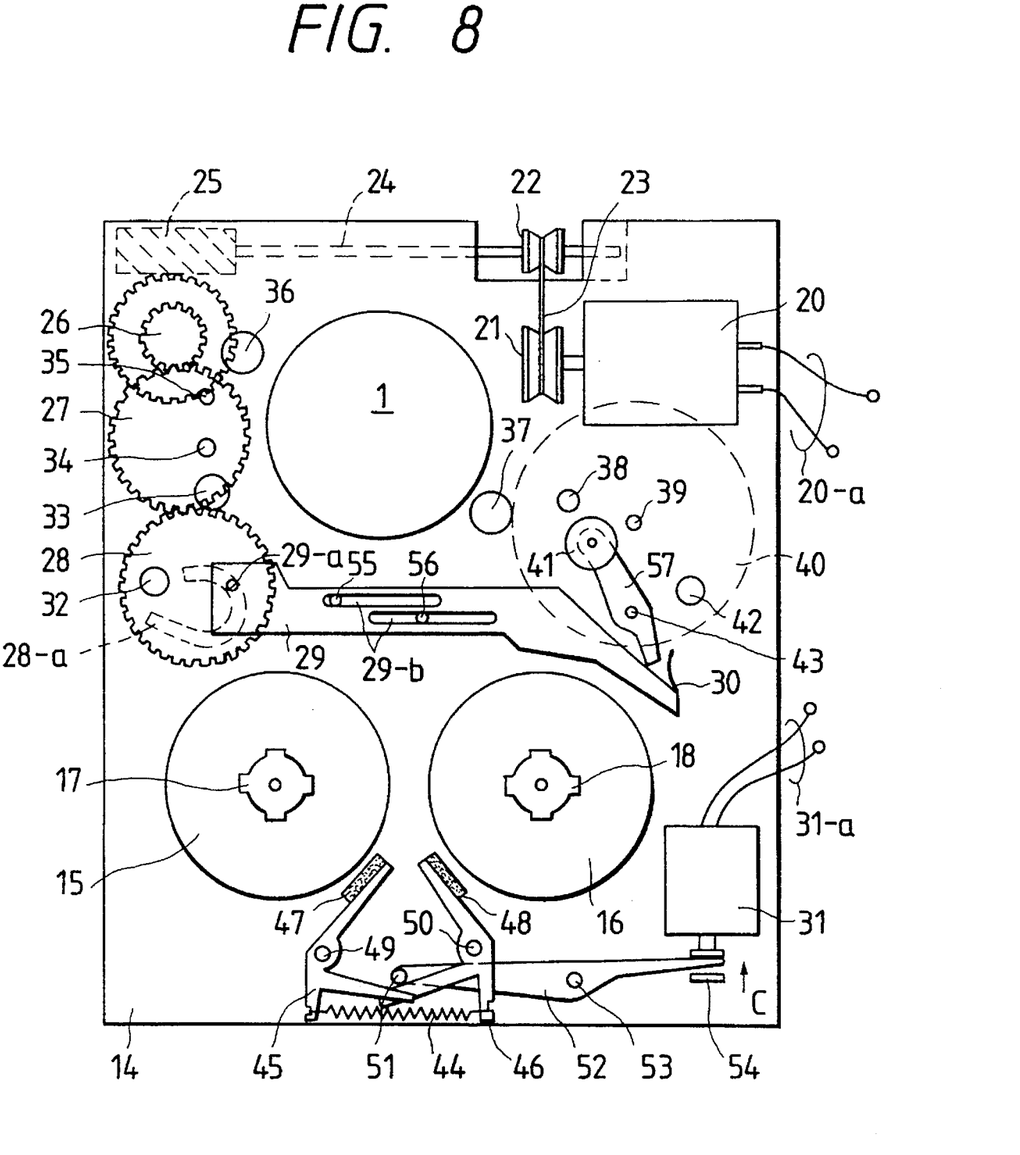

The EJECT mode is for ejecting a cassette, UL.STOP mode for loading a cassette, STOP mode in which the tape is loaded, wound on the cylinder, maintained at rest, and the tape driving system is released, and PB mode which actuates the tape drive system in order to record data on the tape or reproduce data therefrom. The mode is changed in the directions of arrows in the drawing. Described below are the operations of mechanisms for the STOP, PB, and FF/REW modes. FIGS. 6, 7 and 8 are diagrams illustrating operations of the mechanisms: FIG. 6 shows the PB mode, FIG. 7 shows the STOP mode, and FIG. 8 shows the FF/REW mode. First, designations and constitution of the mechanism will be described with reference to FIG. 6.

Reference numeral 14 denotes a chassis, 15 denotes an S-reel motor, 16 denotes a T-reel motor, 17 denotes an S-reel plate, 18 denotes a T-reel plate, 19 denotes a cassette, 20 denotes a mode motor, 20-a denotes voltage application leads, reference numerals 21 and 22 denote pulleys, 23 denotes a belt, 24 denotes a transmission shaft, 25 denotes a worm gear, reference numerals 26, 27 and 28 denote gears, 29 denotes a slider, 30 denotes a pressing spring, 31 denotes a brake solenoid, 31-a denotes voltage application leads, 34 and 35 denote fixing pins, reference numerals 32, 33, 36, 37, 38 and 42 denote guide rollers, 39 denotes a capstan, 40 denotes a capstan motor, 43 denotes a rotary shaft, 41 denotes a pinch roller, 44 denotes a coil spring 45 and 46 denote brake arms, 47 and 48 denote brake felts, reference numerals 49, 50 and 53 denote rotary shafts, 51 denotes a drive pin, 52 denotes a control arm, 54 denotes a movable core, 55 and 56 denote positioning pins, and reference numeral 57 denotes a pinch roller arm.

The tape 13 (not shown) wound in the cassette 19 is guided by the guide rollers 32, 33, 36, 37, 38 and 42 and by the fixed pins 34 and 35, and is fed by the pinch roller 41 and the capstan 39 that revolves together with the capstan motor 40. At this moment, a predetermined back torque is applied by the S-reel motor 15 to provide a constant tape tension. The tape 13 fed by the capstan 39 is taken up in the cassette 19 by the T-reel motor 16.

The pulley 21 is pressed into the mode motor 20 and is coupled via the belt 23 to the pulley 22 that is pressed into one end of the transmission shaft 24.

To the other end of the transmission shaft 24 is fitted the worm gear 25. The worm gear 25 and the gears 26, 27 and 28 form a reduction train. The gear 28 has a spiral groove 28-a which engages with the pin 29-a provided on the slider 29.

The slider 29 is capable of reciprocally moving in the right and left directions in the drawing owing to elongated grooves 29-b and positioning pins 55 and 56. To the other end of the slider 29 is fastened the pressing spring 30.

The pinch roller arm 57 is rotatable about the rotary shaft 43 and has the pinch roller 41 arranged at the tip thereof.

Its other end is engageable with the compression spring 30. When a predetermined voltage is applied to the voltage application leads 20-a of the mode motor 20, the generated torque is amplified before it reaches the gear 28. That is, the gear 28 is turned in a direction A maintaining a predetermined torque. Therefore, the slider 29 reciprocally moves in a direction B owing to the spiral grooves 29-b.

The pressing spring 30 gives a moment of force to the pinch roller arm 57 in the clockwise direction. This moment becomes a pressing force of the pinch roller 41 against the capstan 39.

The brake arms 45 and 46 are rotated about the rotary shafts 49 and 50, respectively, and are so biased by the spring 44 as to pull each other.

The brake felts 47 and 48 are adhered to the ends of the brake arms 45 and 46. The control arm 52 is rotatable about the rotary shaft 53, and has the drive pin 51 on one end thereof, the other end of the arm 52 is engaged with the movable core 54 of the solenoid 31.

When a predetermined voltage is applied through the voltage application wires 31-*a* to the solenoid 31, the movable core 54 moves in the direction C.

At the same time, the brake felts 47 and 48 adhered to the brake arms separate away from the reel motors 15 and 16 due to the turn of the drive pin 51.

Next, operation of the mechanism in the STOP mode will be described in conjunction with FIG. 7. In response to the instruction for shifting the PB mode into the STOP mode, a predetermined voltage is applied to the mode motor 20 and the gear 28 rotates in the direction A.

As a result, the pinch roller arm 57 is rotated counter-clockwise due to the movement of the slider 29 in the direction B. That is, the pinch roller 41 is separated away from the capstan 39.

At the same time, the movable core 54 o f the solenoid 31 moves in the direction C, and the drive pin 51 of the control arm 52 is separated away from the brake arms 45 and 46.

That is, the brake locks the S-reel motor 15 and the T-reel motor 16.

Operation of the mechanism in the FF/REW mode will now be described in conjunction with FIG. 8. When the STOP mode is shifted into the FF/REW mode, the movable core 54 of the solenoid 31 moves in the direction C to release the brake.

Figure 9:
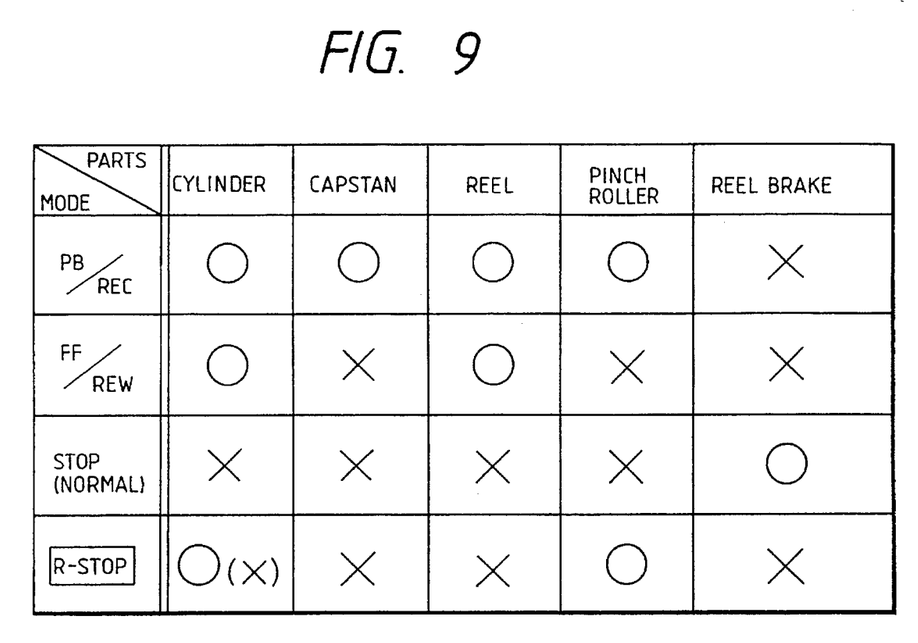
FIG. 9 is a view illustrating the movements of parts in each of the modes.

FIG. 9 shows the operation conditions of the parts in each of the modes. The differences of the operations of the mechanism between the STOP mode and the PB mode exist in ON/OFF of brake, ON/OFF of the pinch roller, ON/OFF of the cylinder motor, and ON/OFF of the capstan motor.

Here, "ON" of the brake is a state that the reel motors 15 and 16 are stopped and are not permitted to rotate. Further, "ON" of the pinch roller is a state that the pinch roller is forcedly pressed against the capstan. ON/OFF of the motors stands for rotation/stop.

In the PB mode, here, an R-STOP mode is set in which the capstan motor 40 only is stopped. The mode of the mechanism is not the STOP mode, but the PB mode. That is, the brake is not applied to the reel motor and the pinch roller is not separated away from the capstan.

Figure 10:
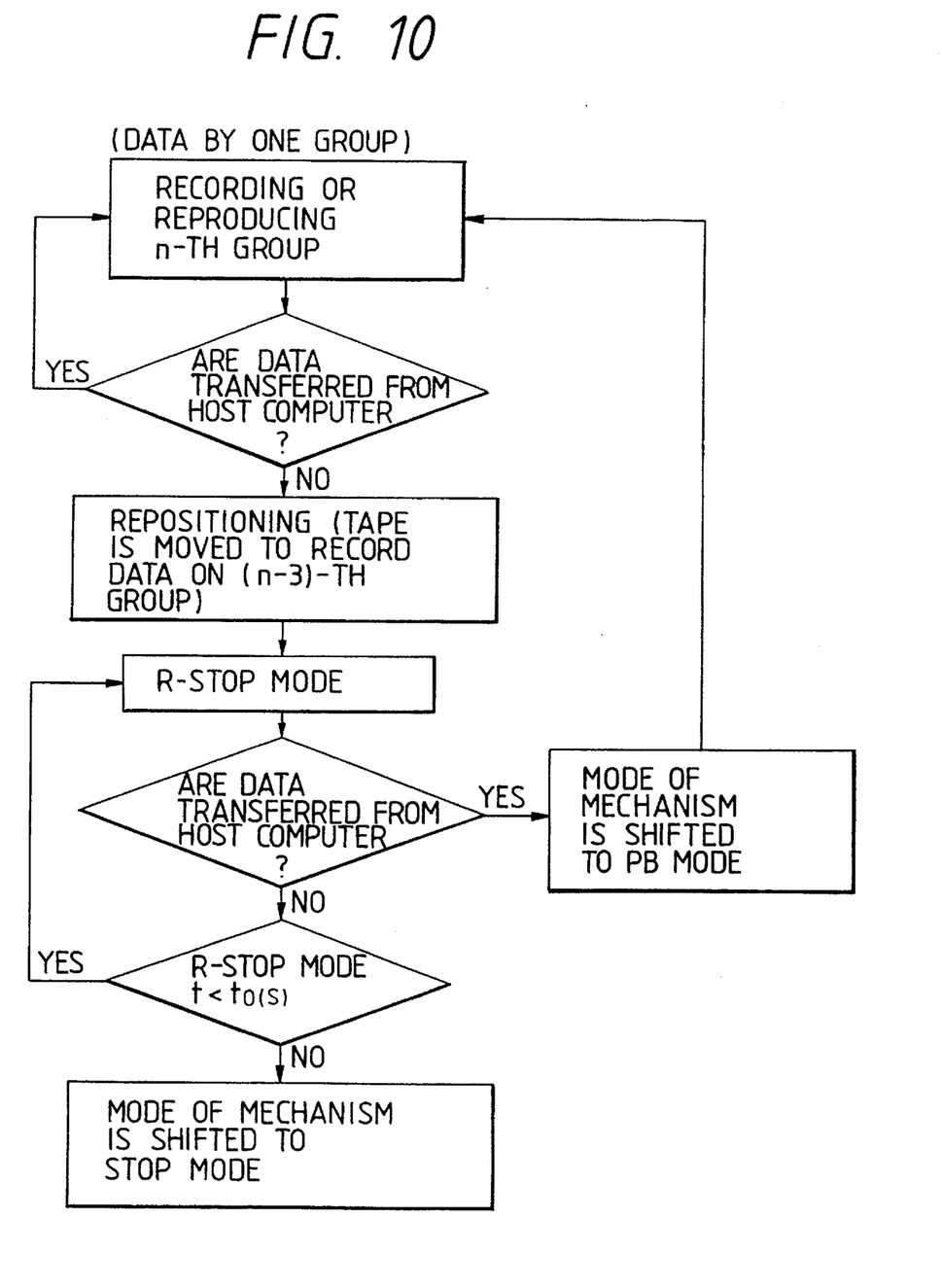
FIG. 10 is a flow chart.

Next, the present invention will be described in detail with reference to the flow chart of FIG. 10.

It is not assumed that the data are recorded on the n-th group on the tape. Then, the data are recorded on the (n+1)-th group. Here, however, unless the data are transferred from the host computer 3 of FIG. 3, the repositioning operation is carried out to establish a data stand-by state. When the data are transferred during the data stand-by state after the repositioning operation has been finished, the tape is moved to continuously record the data on the (n+1)-th group.

Figure 11:
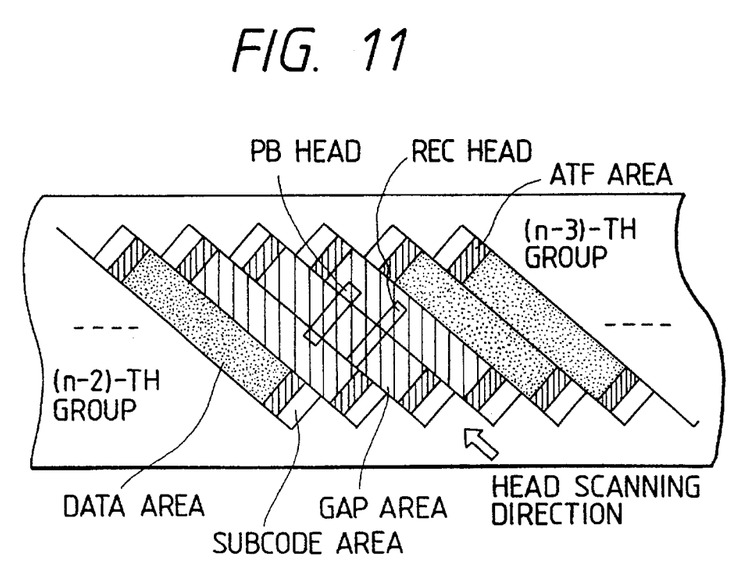
FIG. 11 is a view of tape pattern.

After the completion of repositioning operation, according to the present invention, the tape position is so controlled by the capstan motor 40 that the head 2 of the cylinder 1 scans the gap area between the (n−3)-th group and the (n−2)-th group as shown in FIG. 11. Under this condition, the capstan motor 40 only is stopped. This is the R-STOP condition shown in FIG. 9.

When the data are transferred from the host computer 3 under the R-STOP condition within the time $t_0$, the capstan motor 40 is readily started and the data are recorded on the (n+1)-th group.

When the time $t_0$ is lapsed in the R-STOP state, however, the mode of the mechanism is shifted to the STOP mode. That is, when the stand-by time is long, rotation of the cylinder is stopped, the brake is applied, and the pressing by the pinch roller is released.

According to the present invention, the repositioning is effected at the time of recording and reproducing the data by the group without shifting the mode of the mechanism by stopping only the capstan motor. Hence, the mode motor is not actuated. This enables the life of the mode motor to be lengthened. At a position where the repositioning is completed, furthermore, the tape position is so controlled that a portion where the head repetitively scans the tape comes into agreement with the gap area between the groups, and the time is controlled in the R-STOP mode so that the same portion of the tape will not be damaged by the pinch roller. Only when a predetermined period of time has lapsed, the mode of the mechanism is shifted from the R-STOP mode to the STOP mode. This makes it possible to improve the reliability of the recorded data and to prevent the tape from being damaged.

The present invention can be put into practice in any other form than the above-mentioned embodiment without departing from the spirit and the gist of the invention. It should therefore be noted that the above mentioned is merely an example of the invention in all respects and is in no way limited thereto only. The scope of the invention is stated in the claims. Further, any modifications and changes that pertain to the equivalent scope of the claims of the invention.

What is claimed is:

1. A magnetic recording and reproducing apparatus which records or reproduces data onto or from a magnetic tape using magnetic heads in a recording format that the data are divided into a plurality of groups, each of the groups of data including a gap area having no data, the data being recorded on said magnetic tape one group by one group, said apparatus comprising:

a cylinder device in which said magnetic heads are mounted on a rotary unit, said magnetic tape is wound around the outer peripheral surface of said cylinder device, and by the rotation of said rotary unit, said magnetic heads perform helical scanning along the surface of said magnetic tape; and means for controlling the positioning of said magnetic tape with respect to at least one rotating magnetic head, said control means providing a plurality of modes of operation of said apparatus including at least a recording or reproducing mode in which said magnetic tape is permitted to run at a predetermined speed to record or reproduce data, a repositioning stop mode where the running of said magnetic tape is temporarily stopped and repositioned, and a normal stop mode where the running of said magnetic tape is completely stopped, said control means in said repositioning stop mode at least temporarily stopping said magnetic tape at a position relative to at least one of said rotating magnetic head where a portion corresponding to the gap area included in one recorded data group is scanned by said at least one rotating magnetic head to avoid loss of data due to damage of a recorded data portion of said magnetic tape by continuous contact of said at least one rotating magnetic head with the recorded data portion of said magnetic tape and for repositioning said magnetic tape with respect to said at least one rotating magnetic head away from the gap area included in the one recorded data group to enable reproduction of recorded data and/or a recording of a subsequent data group in an unrecorded area of said magnetic tape in the reproducing or recording mode.

2. A magnetic recording and reproducing apparatus according to claim 1, further comprising a host computer for supplying data for recording on said magnetic tape and for receiving recorded data from said magnetic tape, said control means being responsive to said host computer for switching modes thereof.

3. A magnetic recording and reproducing apparatus according to claim 2, wherein said control means is responsive to said host computer for repositioning said magnetic tape for enabling recording of a subsequent data group of an unrecorded area of said magnetic tape.

4. A magnetic recording and reproducing apparatus which records or reproduces data onto or from a magnetic tape using magnetic heads in a recording format that the data are divided into a plurality of groups, each of the groups of data including a gap area having no data, the data being recorded on said magnetic tape one group by one group, said apparatus comprising:

a) a cylinder device in which said magnetic heads are mounted on a rotary unit, said magnetic tape is wound around the outer peripheral surface of said cylinder device, and by the rotation of said rotary unit said magnetic heads perform helical scanning along the surface of said magnetic tape;

b) a tape driving unit which has a driving force generating unit to drive said magnetic tape wound on said cylinder device along a predetermined running path at a predetermined speed, said driving force generating unit having a drive motor that controls the stop position of said magnetic tape;

c) a drive microcomputer which switches the mechanical condition of said magnetic tape from at least the recording or reproducing mode in which said magnetic tape is permitted to run at a predetermined speed to record or reproduce data into at least a repositioning stop mode where the running of said magnetic tape is temporarily stopped and repositioned and a normal stop mode where the running of said magnetic tape is completely stopped; and d) a tape run control unit having control means including a first control signal generating unit for generating a signal to control said drive motor in said tape driving unit such that in said repositioning stop mode said magnetic tape is temporarily stopped at a position relative to at least one of said magnetic heads where a portion corresponding to the gap area included in one recorded data group which is at least one group before an unrecorded area of said magnetic tape onto which a subsequent data group is to be recorded is scanned by said at least one rotating magnetic head to avoid loss of data due to damage of a recorded data portion of said magnetic tape by continuous contact of said at least one rotating magnetic head with the recorded data portion of said magnetic tape when said apparatus is caused by said drive microcomputer to be in the repositioning step in which said magnetic tape is stopped and said magnetic tape is repositioned for enabling at least one of reproduction of a recorded data group and recording of the subsequent data group in an unrecorded area of said magnetic tape.

5. A magnetic recording and reproducing apparatus according to claim 4, wherein said tape driving unit has a capstan and a pinch roller pressed against said capstan, which are provided on the downstream side of said cylinder device along the path in which the tape runs in the forward direction, which come in contact with said tape over a predetermined length in the lateral direction of the tape, and which rotate to drive said tape, said capstan in both said normal stop mode and said repositioning stop mode being nondriven, said pinch roller being pressed against said capstan with said rotating head scanning said gap area in said repositioning stop mode and said pinch roller not being pressed against said capstan in said normal stop mode.

6. A magnetic recording and reproducing apparatus according to claim 4, further comprising a host computer for supplying data for recording on said magnetic tape and for receiving recorded data from said magnetic tape, said microcomputer being responsive to said host computer for switching modes thereof.

7. A magnetic recording and reproducing apparatus according to claim 6, wherein said control means is responsive to said microcomputer for repositioning said magnetic tape for enabling recording of a subsequent data group of an unrecorded area of said magnetic tape.

8. A magnetic recording and reproducing method recording or reproducing data onto or from a magnetic tape using magnetic heads mounted on a rotary unit of a cylinder device and said magnetic tape being wound around the outer peripheral surface-of said cylinder device, comprising the steps of:

(a) rotating the rotary unit so that the magnetic heads perform helical scanning along the surface of said magnetic tape;

(b) recording data utilizing a recording format that the data are divided into a plurality of groups, each of the groups of data including a gap area having no data, the data being recorded on said magnetic tape one group by one group; and (c) controlling the positioning of said magnetic tape with respect to at least one rotating magnetic head and providing a plurality of modes of operation including at least a recording or reproducing mode in which said magnetic tape is permitted to run at a predetermined speed to record or reproduce data, a repositioning stop mode where the running of said magnetic tape is temporarily stopped and repositioned, and a normal stop mode where the running of said magnetic tape is completely stopped;

wherein in said repositioning stop mode, the step of controlling includes at least temporarily stopping said magnetic tape at a position relative to at least one of the rotating magnetic heads where a portion corresponding to the gap area included in one recorded data group is scanned by the at least rotating magnetic head to avoid loss of data due to damage of a recorded data portion of said magnetic tape by continuous contact of said at least one rotating magnetic head with the recorded data portion of said magnetic tape and for repositioning said magnetic tape with respect to said at least one rotating magnetic head away from the gap area included in the one recorded data group to enable reproduction of recorded data and/or a recording of a subsequent data group in unrecorded area of said magnetic tape in the reproducing or recording mode.

9. A magnetic recording and reproducing method according to claim 8, wherein a host computer is provided for supplying data for recording on said magnetic tape and for receiving recorded data from said magnetic tape, and switching modes in response to said host computer.

10. A magnetic recording and reproducing method according to claim 9, further comprising the step of repositioning said magnetic tape for enabling recording of a subsequent data group of an unrecorded area of said magnetic tape in response to the host computer.

11. A magnetic recording and reproducing apparatus according to claim 1, wherein said control means in said normal stop mode enables complete stoppage of the running of said magnetic tape with substantially no delay.

12. A magnetic recording and reproducing apparatus according to claim 4, wherein said control means of said tape run control unit in said normal stop mode enables complete stoppage of the running of said magnetic tape with substantially no delay.

13. A magnetic recording and reproducing method according to claim 8, wherein in said normal stop mode, the step of controlling includes completely stopping the running of said magnetic tape with substantially no delay.

14. A magnetic recording and reproducing apparatus which records or reproduces data onto or from a magnetic tape using magnetic heads in a recording format that the data are divided into a plurality of groups, each of the groups of data including a gap area having no data, said apparatus comprising:

a cylinder device in which said magnetic heads are mounted on a rotary unit, said magnetic tape being wound around the outer peripheral surface of said cylinder device, and by the rotation of said rotary unit, said magnetic heads perform helical scanning along the surface of said magnetic tape; and means for controlling the positioning of said magnetic tape with respect to at least one rotating magnetic head, said control means providing a plurality of modes of operation of said apparatus including at least a recording or reproducing mode in which said magnetic tape is permitted run at a predetermined speed to record or reproduce data, a repositioning stop mode where the running of said magnetic tape is temporarily stopped and repositioned, and a normal stop mode where the running of said magnetic tape is completely stopped, said control means enabling switching from said recording or reproducing stop mode to said normal stop mode via a repositioning stop mode when transfer of data is stopped, said control means, in said repositioning stop mode, initially enabling stopping of driving of said magnetic tape with said cylinder device being rotated and thereafter enabling stopping of both the driving of said magnetic tape and the rotation of said cylinder device.

15. A magnetic recording and reproducing method recording or reproducing data onto or from a magnetic tape using magnetic heads mounted on a rotary unit of a cylinder device and said magnetic tape being wound around the outer peripheral surface of said cylinder device, comprising the steps:

(a) rotating the rotary unit so that the magnetic heads perform helical scanning along the surface of said magnetic tape;

(b) recording data utilizing a recording format that the data are divided into a plurality of groups, each of the groups of data including a gap area having no data; and (c) controlling the positioning of said magnetic tape with respect to at least one rotating magnetic head and providing a plurality of modes of operation including at least a recording or reproducing mode in which said magnetic tape is permitted to run at a predetermined speed to record or reproduce data, a repositioning stop mode where the running of said magnetic tape is temporarily stopped and repositioned, and a normal stop mode where the running of said magnetic tape is completely stopped;

wherein the step of controlling includes switching from said recording or reproducing mode to said normal stop mode via said repositioning stop mode, when transfer of data is stopped, the step of controlling including in said repositioning stop mode, initially stopping driving of said magnetic tape with said cylinder device being rotated and thereafter stopping both the driving of said magnetic tape and the rotation of said cylinder device.

* * * * *